United States Patent Office 3,483,211
Patented Dec. 9, 1969

3,483,211
3-PICRYLAMINO-1,2,4-TRIAZOLE AND ITS PREPARATION
Michael D. Coburn, Los Alamos, N. Mex., assignor to the United States of America as represented by the United States Atomic Energy Commission
No Drawing. Filed May 17, 1967, Ser. No. 640,446
Int. Cl. C07d 55/06
U.S. Cl. 260—308                              2 Claims

ABSTRACT OF THE DISCLOSURE

The method of preparing 3-picrylamino-1,2,4-triazole in which 3-amino-1,2,4-triazole and picryl chloride are dissolved in N,N-dimethylformamide, heating the solution at a temperature of 100° C. for a period of 5 hours, pouring the solution into ice water and filtering the resulting precipitate, and the product which is a heat resistant explosive of said method.

---

The invention described herein was made in the course of, or under, a contract with the U.S. Atomic Energy Commission.

The inventor has discovered a novel compound, namely, 3-picryl-amino-1,2,4-triazole, and a method of preparing same. The compound, 3-picrylamino-1,2,4-triazole is useful as a heat resistant explosive. In addition the inventor has discovered that the said compound is insensitive to impact, thus making it safe to process and store. Furthermore, the method of preparation is a one-step process which uses commercially available starting materials.

It is therefore an object of this invention to state a method of preparing 3-picrylamino-1,2,4-triazole, a novel compound.

Other objects of this invention will be apparent from the following description of the preferred embodiment. The 3-amino-1,2,4-triazole (2.10 g., 0.025 mole) and picryl chloride (2.47 g., 0.01 mole) are dissolved in 25 ml. of N,N-dimethylformamide (DMF) and the resulting solution is heated at 100° C. for 5 hours. The solution is poured into 200 ml. of ice and water and the precipitated solid is collected by filtration, washed with water and dried to give 2.84 g. (96%) of 3-picrylamino-1,2,4-triazole, M.P. 304.5° (dec.) One recrystallization from γ-butyrolactone raised the melting point to 310° (dec.). The compound has a crystal density of 1.936 g./cc.

*Analysis.*—Cal. for $C_8H_5N_7O_6$: C, 32.55; H, 1.71; N, 33.22. Found: C, 32.67; H, 1.93; N, 33.05.

The compound 3-picrylamino-1,2,4-triazole may be represented by any or all of the following tautomeric structures:

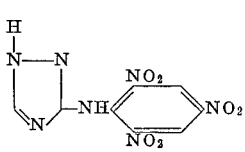
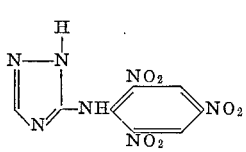
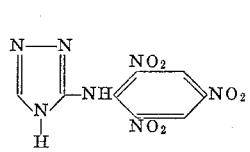
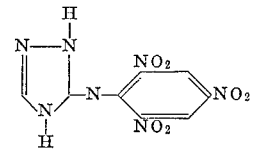

The inventor has tested the product, 3-picrylamino-1,2,4-triazole, and the following are the results of the various tests:

(1) Differential thermal analysis and pyrolysis studies indicate that 3-picrylamino-1,2,4-triazole is thermally stable up to 300° C.

(2) Its drop weight impact sensitivity with a 2.5 kg. weight is greater than 320 cm.

(3) A detonation calculation with the Becker-Kistiakowsky-Wilson equation of state predicts the compound to have a detonation velocity of 7850 m./sec. and a C-J pressure of 307 kbar at its crystal density.

Although the above description discloses a process in which yields are optimized, it is apparent that the parameters of said process may be varied without departing from the scope of this invention which is to be limited only by the appended claims. In particular, the above embodiment of the preparation of 3-picrylamino-1,2,4-triazole uses an excess of 3-amino-1,2,4-triazole as a hydrogen chloride scavenger. It is probable that any tertiary amine from the class represented by triethylamine, pyridine, etc., could be used in this capacity. But since 3-amino-1,2,4-triazole is relatively inexpensive, only a small cost advantage is gained.

What is claimed is:

1. A method of preparing 3-picrylamino-1,2,4-triaozle comprising dissolving 3-amino-1,2,4-triazole and picryl chloride in N,N-dimethylformamide, heating the resulting solution at a temperature of 100° C. for a period of 5 hours, pouring the solution into ice water and filtering the resulting precipitate.

2. The compound, 3-picrylamino-1,2,4-triazole consisting of at least one of the following tautomeric forms:

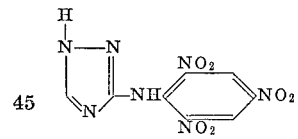
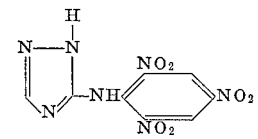
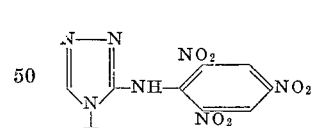
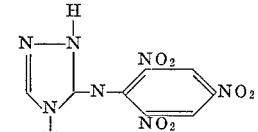

References Cited

Elderfield: Heterocyclic Compounds, vol. 7, New York, 1961, pp. 446–450.

ALTON D. ROLLINS, Primary Examiner

U.S. Cl. X.R.

149—92